US010546500B2

(12) United States Patent
Goto et al.

(10) Patent No.: US 10,546,500 B2
(45) Date of Patent: Jan. 28, 2020

(54) VEHICLE DISPATCH METHOD, VEHICLE DISPATCH SYSTEM, AND PARKING FEE CHARGING SYSTEM INCLUDING THE SAME

(71) Applicant: TOYOTA JIDOSHA KABUSHIKI KAISHA, Toyota-shi, Aichi-ken (JP)

(72) Inventors: Jun Goto, Toyota (JP); Naoki Kurokawa, Tokyo-to (JP); Takenori Shimizu, Inuyama (JP); Junya Watanabe, Shizuoka-ken (JP); Koji Kawasaki, Anjo (JP)

(73) Assignee: TOYOTA JIDOSHA KABUSHIKI, Toyota-shi (JP)

( * ) Notice: Subject to any disclaimer, the term of this patent is extended or adjusted under 35 U.S.C. 154(b) by 0 days.

(21) Appl. No.: 16/161,841

(22) Filed: Oct. 16, 2018

(65) Prior Publication Data

US 2019/0122560 A1 Apr. 25, 2019

(30) Foreign Application Priority Data

Oct. 20, 2017 (JP) .................. 2017-203715

(51) Int. Cl.
*H04Q 1/20* (2006.01)
*G08G 1/00* (2006.01)
(Continued)

(52) U.S. Cl.
CPC ............. *G08G 1/202* (2013.01); *B60W 30/06* (2013.01); *G05D 1/0088* (2013.01);
(Continued)

(58) Field of Classification Search
CPC ....... G08G 1/202; G08G 1/143; B60W 30/06; G05D 1/0088; G05D 1/0291; G05D 2201/0213; G06Q 10/02; G06Q 50/30
See application file for complete search history.

(56) References Cited

U.S. PATENT DOCUMENTS

2003/0162536 A1* 8/2003 Panico ..................... G08G 1/14
455/456.3
2015/0199619 A1 7/2015 Ichinose et al.
(Continued)

FOREIGN PATENT DOCUMENTS

JP 2015-179331 A 10/2015
JP 2015-191357 A 11/2015
WO 2014-024254 A1 2/2014

*Primary Examiner* — Munear T Akki
(74) *Attorney, Agent, or Firm* — Huntons Andrews Kurth LLP (57) ABSTRACT

A vehicle dispatch method is a method for dispatching vehicles by a server, each of the vehicles being configured to perform automated driving. The vehicle dispatch method includes first to fifth steps. The first step is a step of dispatching the vehicle to a current location of a user. The second step is a step of dispatching the vehicle with no driver on board to a destination of the user using positional information of the destination. The third step is a step of, when the vehicle arrives at the destination, parking the vehicle at a parking space. The fourth step is a step of, when it is detected that the vehicle with the user on board approaches the parking space, moving the vehicle from the parking space. The fifth step is a step of parking the vehicle at the parking space where the vehicle has been parked.

6 Claims, 7 Drawing Sheets

(51) Int. Cl.
*G05D 1/00* (2006.01)
*B60W 30/06* (2006.01)
*G06Q 50/30* (2012.01)
*G05D 1/02* (2006.01)
*G08G 1/14* (2006.01)
*G06Q 10/02* (2012.01)

(52) U.S. Cl.
CPC ........... *G05D 1/0291* (2013.01); *G06Q 10/02* (2013.01); *G06Q 50/30* (2013.01); *G08G 1/143* (2013.01); *G05D 2201/0213* (2013.01)

(56) References Cited

U.S. PATENT DOCUMENTS

| | | | |
|---|---|---|---|
| 2017/0146354 A1* | 5/2017 | Boss | B60L 58/12 |
| 2017/0206472 A1* | 7/2017 | Kihara | G06Q 10/02 |
| 2018/0315311 A1* | 11/2018 | Chowanic | G08G 1/143 |

* cited by examiner

VEHICLE DISPATCH METHOD, VEHICLE DISPATCH SYSTEM, AND PARKING FEE CHARGING SYSTEM INCLUDING THE SAME

This nonprovisional application is based on Japanese Patent Application No. 2017-203715 filed on Oct. 20, 2017 with the Japan Patent Office, the entire contents of which are hereby incorporated by reference.

BACKGROUND

Field

The present disclosure relates to a vehicle dispatch method, a vehicle dispatch system, and a parking fee charging system including the same, and more particularly to a technology of dispatching a vehicle configured to perform automated driving.

Description of the Background Art

In recent years, the technology of automated driving has been developed rapidly, and a service utilizing a vehicle (automated-driving vehicle) configured to perform automated driving has been proposed. For example, Japanese Patent Laying-Open No. 2015-179331 provides an apparatus for encouraging a user to use leisure.

In Japanese Patent Laying-Open No. 2015-179331, a schedule related to a volunteer activity is sent to a terminal of a user who is spending leisure. If the user agrees on the schedule, an automated-driving vehicle (movable body 40 in Japanese Patent Laying-Open No. 2015-179331) is dispatched to the current location of the user. The user gets on the dispatched automated-driving vehicle and moves to the location of the volunteer activity. This can encourage the user to use his/her leisure (see, for example, Japanese Patent Laying-Open No. 2015-179331, paragraphs [0026] and [0027]).

SUMMARY

In general, an automated-driving vehicle is dispatched to a current location of a user, picks up the user there, and travels toward a destination of the user (see Japanese Patent Laying-Open No. 2015-179331). The inventors of the present disclosure, however, has focus on the fact that, if a location to which an automated-driving vehicle is dispatched can be selected rather than being limited to a current location of a user, user convenience will be enhanced in a vehicle dispatch service using an automated-driving vehicle.

An object of the present disclosure, which has been made to solve the above problem, is to enhance user convenience in a vehicle dispatch method and a vehicle dispatch system for an automated-driving vehicle. Another object of the present disclosure is to enhance user convenience in a parking fee charging system.

A vehicle dispatch method according to an aspect of the present disclosure is a method for dispatching a first vehicle and a second vehicle by a vehicle dispatch server, each of the first vehicle and the second vehicle being configured to perform automated driving. The vehicle dispatch method includes first to fifth steps. The first step is a step of receiving positional information of a current location of a user and positional information of a destination of the user from a terminal of the user, and dispatching the first vehicle to the current location using the positional information of the current location, by the vehicle dispatch server. The second step is a step of dispatching, by the vehicle dispatch server, the second vehicle with no driver on board to the destination using the positional information of the destination. The third step is a step of, when the second vehicle arrives at the destination, parking the second vehicle at a parking space in the destination. The fourth step is a step of, when it is detected that the first vehicle with the user on board approaches (comes close to) the parking space, moving the second vehicle from the parking space. The fifth step is a step of parking the first vehicle at the parking space where the second vehicle has been parked.

According to the method of the above, the second vehicle is used to reserve a parking space. The user can therefore reliably secure a parking space for the first vehicle. Thus, user convenience is enhanced.

Preferably, the first vehicle includes a detector configured to detect a situation outside the first vehicle. The step of moving (fourth step) includes: when the first vehicle detects the second vehicle with the detector, notifying the second vehicle, by the first vehicle, that the first vehicle has detected the second vehicle; and in response to the notifying by the first vehicle, moving the second vehicle from the parking space.

Preferably, the second vehicle includes a detector configured to detect a situation outside the second vehicle. The step of moving (fourth step) includes moving the second vehicle from the parking space when the second vehicle detects the first vehicle with the detector.

Preferably, the first vehicle includes a first detector configured to detect a situation outside the first vehicle. The second vehicle includes a second detector configured to detect a situation outside the second vehicle. The step of moving (fourth step) includes sixth to eighth steps. The sixth step is a step of notifying the second vehicle, by the first vehicle, that the first vehicle has detected the second vehicle with the first detector. The seventh step is a step of detecting the first vehicle by the second vehicle with the second detector. The eighth step is a step of moving the second vehicle from the parking space after the step of notifying (sixth step) and the step of detecting (seventh step).

According to the method of the above, the second vehicle starts moving from the parking lot at the timing when the first vehicle approaches the second vehicle close enough for the detector (including the first and second detectors) to perform detection (for example, close enough for a camera to capture an image). Therefore, the first vehicle can be smoothly parked at the parking space while preventing another vehicle from being parked (or intruding, so to speak) at the parking space of the second vehicle, ahead of the first vehicle (which is described later in detail).

A vehicle dispatch system according to another aspect of the present disclosure includes: a communicator configured to communicate with a first vehicle and a second vehicle each configured to perform automated driving; and a vehicle dispatch server configured to manage dispatch of the first vehicle and the second vehicle. When the vehicle dispatch server receives positional information of a current location of a user and positional information of a destination of the user from a terminal of the user, the vehicle dispatch server dispatches the first vehicle to the current location using the positional information of the current location, and dispatches the second vehicle with no driver on board to the destination using the positional information of the destination. When the second vehicle arrives at the destination, the second vehicle is parked at a parking space in the destination. When it is detected that the first vehicle with the user on board approaches the parking space, the second vehicle moves from the parking space. The first vehicle is parked at the parking space where the second vehicle has been parked.

According to the configuration of the above, a parking space for the first vehicle can be reliably secured by using the second vehicle, as in the method of the above. Thus, user convenience is enhanced.

A parking fee charging system according to still another aspect of the present disclosure includes: the above-described vehicle dispatch system; and a charging server configured to communicate with the vehicle dispatch server in the vehicle dispatch system and determine a parking fee. The parking space is a pay parking space. The charging server is configured to, when the charging server receives from the vehicle dispatch server a notification that the second vehicle was parked at the parking space and that the first vehicle was subsequently parked at the same parking space, determine a sum of a parking fee for the first vehicle and a parking fee for the second vehicle to be lower than when the charging server does not receive the notification.

According to the configuration of the above, a parking fee is reduced and thus a user is encouraged to use the service implemented with space reservation using a second vehicle that automatically travels around. Thus, user convenience is further enhanced.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

An embodiment of the present disclosure is described in detail hereinafter with reference to the drawings. Identical or corresponding parts in the drawings are identically denoted, and the explanation thereof is not repeated.

Embodiment

<Configuration of Vehicle Dispatch System>

Figure 1:
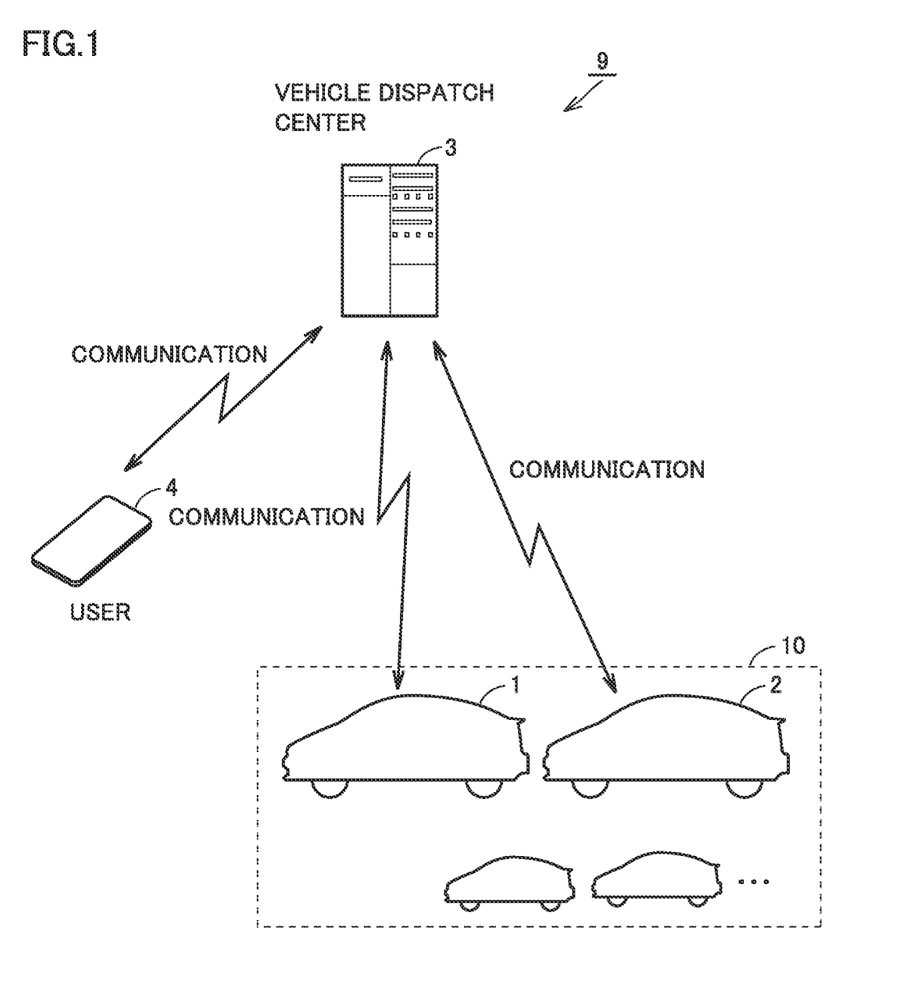
FIG. 1 is a diagram schematically showing a general configuration of a vehicle dispatch system according to the present embodiment.

FIG. 1 is a diagram schematically showing a general configuration of a vehicle dispatch system according to the present embodiment. With reference to FIG. 1, a vehicle dispatch system 9 includes a plurality of vehicles 10 including vehicles 1, 2, and a vehicle dispatch center 3.

Each of a plurality of vehicles 10 is a vehicle configured to perform automated driving (automated-driving vehicle), such as an electric vehicle. Each vehicle 10, however, may be another vehicle (a hybrid vehicle, a fuel cell vehicle, a so-called conventional vehicle).

For example, if vehicle 1 among a plurality of vehicles 10 is a user's private vehicle, vehicle 1 may send the user's family member to a destination, and then travel with no driver on board (automatically travel around) to pick up the user at another location. If each vehicle 10 is a business vehicle (e.g. a taxi and a hire), vehicle 10 may automatically travel around to return to a vehicle dispatch station after dropping off a user, or may automatically travel around before picking up a next user. Thus, the present embodiment assumes a case in which each vehicle 10 is automatically traveling around. Note that automatically traveling around is not limited to a state in which a vehicle is traveling, but may include a state in which a vehicle is stopped (for example, parked on standby).

Vehicle dispatch center 3 is configured to perform two-way communication with vehicle 10, and is also configured to perform two-way communication with a terminal 4 (e.g. a portable terminal, such as a smartphone) owned by a user. Vehicle dispatch center 3 manages a traveling status of each vehicle 10, and selects an appropriate one of a plurality of vehicles 10 in response to a user's request (operation of terminal 4) to dispatch the selected vehicle to the user. Terminal 4 has a global positioning system (GPS) function so that a current location of terminal 4 can be identified.

Figure 2:
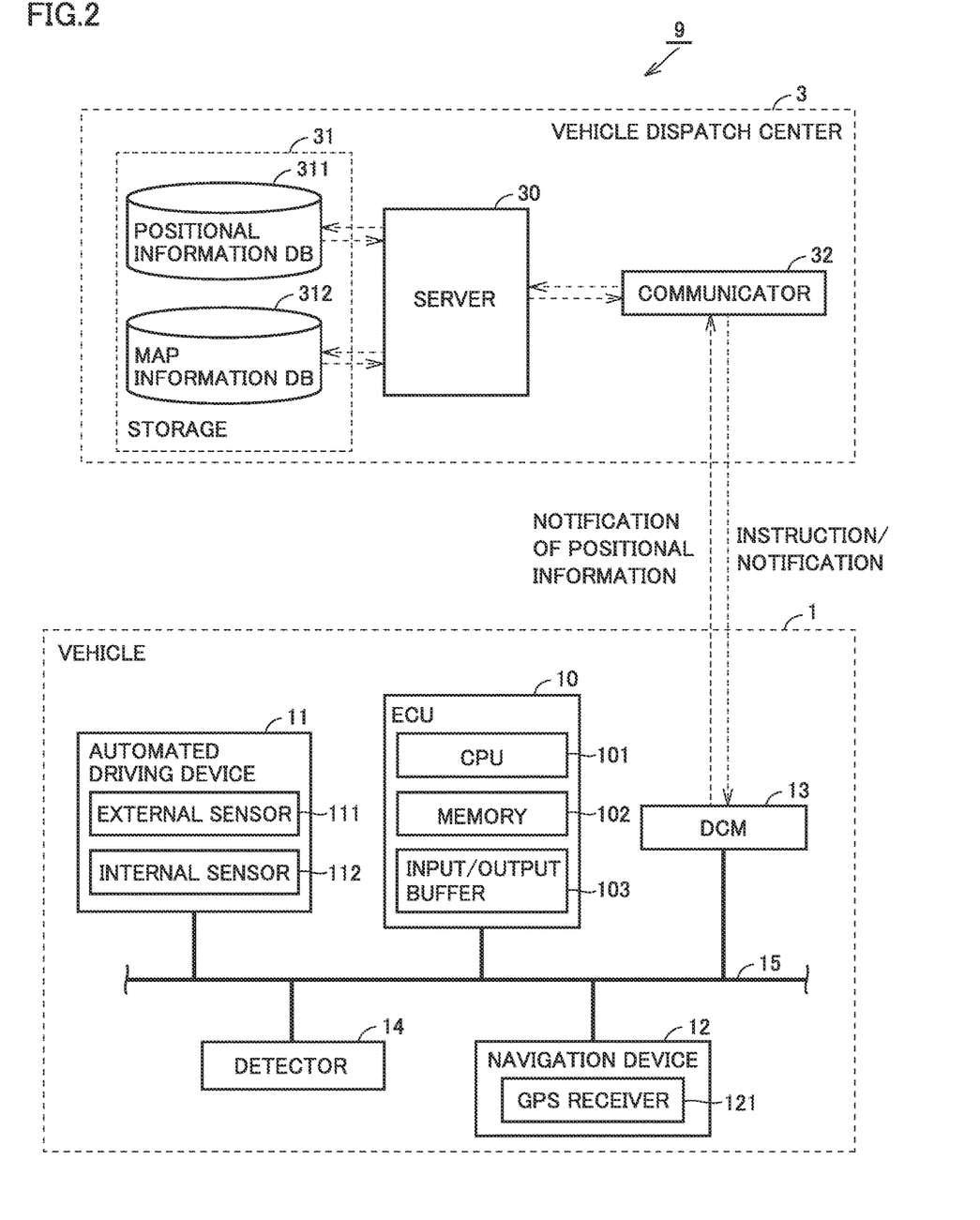
FIG. 2 is a diagram showing a configuration of the vehicle dispatch system in detail.

FIG. 2 is a diagram showing a configuration of vehicle dispatch system 9 in detail. Each of a plurality of vehicles 10 basically has the same basic configuration, and FIG. 2 representatively describes a configuration of vehicle 1.

With reference to FIG. 2, vehicle 1 includes an electronic control unit (ECU) 10, an automated driving device 11, a navigation device 12, a communication module 13, and a detector 14. ECU 10, automated driving device 11, navigation device 12, communication module 13, and detector 14 are connected to one another via a wired on-vehicle network 15, such as a controller area network (CAN).

Automated driving device 11 is configured to perform automated driving of vehicle 1. Automated driving refers to control for executing driving operations, such as acceleration, deceleration, and steering, of vehicle 1 without a driver operating vehicle 1. Automated driving includes, for example, lane keeping assistance control and navigation control. In the lane keeping assistance control, a handle (not shown) is automatically steered so that vehicle 1 can travel along a driving lane without deviating from the driving lane. In the navigation control, if there is no vehicle in front of vehicle 1, constant-speed control is executed in which vehicle 1 is controlled to travel at a constant preset speed; whereas, if there is a vehicle in front of vehicle 1, follow-up control is executed in which the speed of vehicle 1 is adjusted in accordance with the distance from the vehicle in front.

Specifically, automated driving device 11 is configured to perform full-automated driving. In the full-automated driving by automated driving device 11, a driver is required to neither ride in nor operate the vehicle under any situation. Therefore, vehicle 1 is capable of automatically traveling around. The automated driving function by automated driving device 11 may be implemented as a part of the function of ECU 10. Automated driving device 11 includes an external sensor 111 configured to detect a situation outside vehicle 1, and an internal sensor 112 configured to detect information according to the traveling state of vehicle 1 and a steering operation, an accelerating operation, and a braking operation.

External sensor 111 includes, for example, a camera, radar, and laser imaging detection and ranging (LIDAR) (all of which are not shown). The camera captures an image of a situation outside vehicle 1 and outputs, to ECU 10, the captured-image information regarding the situation outside vehicle 1. The radar sends a radio wave (for example, a millimeter wave) to surroundings of vehicle 1 and receives a radio wave reflected by an obstacle to detect the obstacle. The radar outputs, to ECU 10, a distance to the obstacle and a direction of the obstacle as obstacle information regarding the obstacle, for example. The LIDAR transmits light (typically, ultraviolet rays, visible rays, or near infrared rays) to surroundings of vehicle 1 and receives light reflected by an obstacle to measure a distance to the reflecting point and detect the obstacle. The LIDAR outputs, to ECU 10, the distance to the obstacle and a direction of the obstacle as obstacle information, for example.

Internal sensor 112 includes, for example, a vehicle speed sensor, an acceleration sensor, and a yaw rate sensor (all of which are not shown). The vehicle speed sensor is provided at, for example, a wheel of vehicle 1 or a drive shaft that rotates integrally with the wheel. The vehicle speed sensor detects a rotating speed of the wheel, and outputs vehicle speed information including a speed of vehicle 1 to ECU 10. The acceleration sensor includes: a forward/backward acceleration sensor configured to detect acceleration in a forward/backward direction of vehicle 1; and a lateral acceleration sensor configured to detect lateral acceleration of vehicle 1, for example. The acceleration sensor outputs acceleration information including both the accelerations to ECU 10. The yaw rate sensor detects a yaw rate (angular velocity) around the vertical axis of the center of gravity of vehicle 1. The yaw rate sensor is for example a gyroscope sensor, and outputs, to ECU 10, yaw rate information including a yaw rate of vehicle 1.

Navigation device 12 includes a GPS receiver 121 configured to identify a location of vehicle 1 based on radio waves from artificial satellites (not shown). Navigation device 12 executes various types of navigation processes of vehicle 1 using positional information (GPS information) of vehicle 1 identified by GPS receiver 121. Specifically, navigation device 12 calculates a traveling route (expected traveling route or target route) from a current location of vehicle 1 to a destination based on GPS information of vehicle 1 and road map data stored in a memory (not shown), and outputs information on the target route to ECU 10. During driving of vehicle 1 with a driver on board, navigation device 12 notifies a driver of a target route by means of a display or voice output through a speaker (both of which are not shown).

Communication module 13 is an on-vehicle data communication module (DCM), and is configured to enable two-way data communication with ECU 10 and with a server 30 in vehicle dispatch center 3. Communication module 13 may also be configured to communicate with a DCM mounted on another vehicle.

Detector 14, which is for example a camera, detects a situation around vehicle 1 in accordance with a control signal from ECU 10 (specifically, detects another vehicle coming close as described later), and outputs the detection result to ECU 10. As detector 14, the camera included in external sensor 111 of automated driving device 11 may be used.

ECU 10 includes a central processing unit (CPU) 101, a memory 102, and an input/output buffer 103. ECU 10 controls devices in response to a signal from each sensor or the like so that vehicle 1 is in a desired state. For example, ECU 10 controls automated driving device 11 and a device (not shown) for driving the motor generator to execute various types of control (e.g. the lane keeping assistance control and the navigation control described above) for implementing automated driving (including automatically traveling around) of vehicle 1. Further, ECU 10 sends various pieces of information (e.g. positional information of vehicle 1) to server 30 and receives instructions or notifications from server 30, via communication module 13. Thus, the dispatch of vehicle 1 is implemented.

Vehicle dispatch center 3 includes server 30 which is an application server for example, a storage 31, and a communicator 32. Storage 31 includes a positional information database 311 and a map information database 312, each of which is a database server.

Positional information database 311 stores positional information collected from a large number of vehicles 10 including vehicles 1, 2. Positional information database 311 stores positional information of a current location of a user and positional information of a destination of a user. Map information database 312 stores road map data. The positional information and the road map data are used to determine a vehicle to be dispatched from among a large number of vehicles 10, in response to a user's request.

Communicator 32 is configured to enable two-way data communication with communication module 13 mounted on vehicle 1.

Server 30 collects positional information of vehicle 1 (each of a plurality of vehicles 10 including vehicles 1, 2) via communicator 32, and stores the collected positional information in positional information database 311. Server 30 dispatches vehicle 1 using the positional information stored in positional information database 311 and the road map data stored in map information database 312. That is, server 30 corresponds to the "vehicle dispatch server" according to the present disclosure.

<Space Reservation Using Automated-Driving Vehicle>

A user rides in vehicle 1 dispatched in accordance with the user's own request and arrives at a destination D. At this time, the user may want to park vehicle 1 at destination D rather than drop vehicle 1 off to let vehicle 1 automatically travel around. Also, the user may want to secure a parking space for vehicle 1 so that the user can smoothly move to a next destination after finishing an errand at destination D, for example. There is a possibility, however, that the user may not be able to secure a parking space for vehicle 1 with the user on board, such as a case in which destination D is quite congested and in which parking spaces in destination D are already full of other vehicles, for example.

In view of such circumstances, the present embodiment adopts a configuration in which, when a user go toward destination D by vehicle 1, another vehicle 2 automatically traveling around is instructed to go to destination D ahead of vehicle 1 to reserve a space. This control is hereinafter referred to as "space-reservation control". Executing the space-reservation control enables the user to reliably secure a parking space for vehicle 1.

FIG. 3A to FIG. 3D are diagrams schematically showing example space-reservation control in the present embodiment. Here, a situation is described in which a user has notified vehicle dispatch center 3, by operating terminal 4, of positional information of destination D of vehicle 1 (first vehicle) to be taken by the user; and in which vehicle 2 (second vehicle) automatically traveling around with no driver on board is closer to destination D than vehicle 1 is to destination D (that is, vehicle 2 can arrive at destination D ahead of vehicle 1).

Figure 3A:
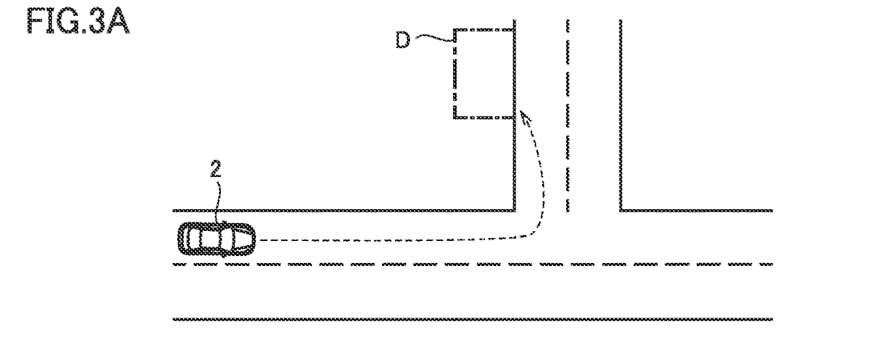
FIG. 3A is a diagram (the first diagram) schematically showing example space-reservation control in the present embodiment.

With reference to FIG. 3A, when vehicle 2 receives the positional information of destination D from vehicle dispatch center 3, vehicle 2 travels toward destination D in accordance with an instruction from vehicle dispatch center 3.

Figure 3B:
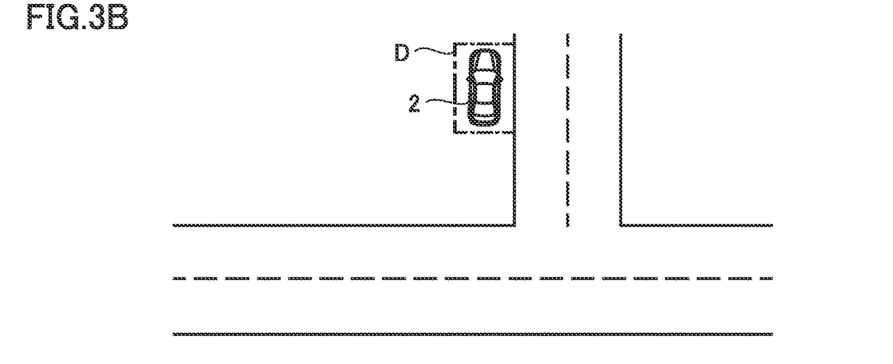
FIG. 3B is a diagram (the second diagram) schematically showing example space-reservation control in the present embodiment.

When vehicle 2 arrives at destination D, vehicle 2 is parked at a parking space in destination D (see FIG. 3B). In other words, vehicle 2 reserves a parking space in destination D for the user. This can prevent another vehicle (not shown) from being parked at the parking space in destination D and occupying the parking space.

Figure 3C:
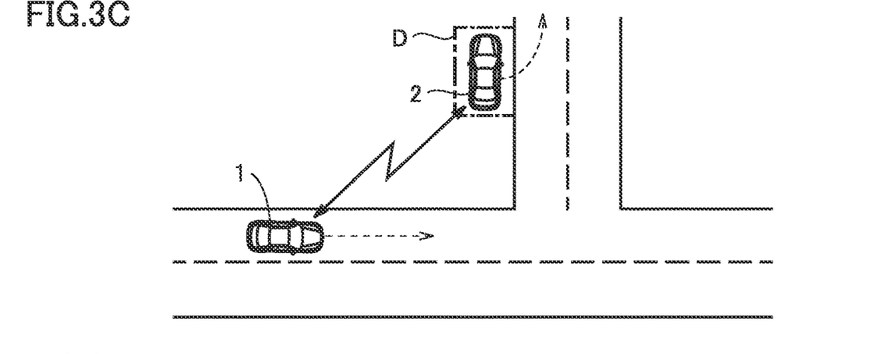
FIG. 3C is a diagram (the third diagram) schematically showing example space-reservation control in the present embodiment.

Subsequently, as shown in FIG. 3C, vehicle 1 with the user on board approaches destination D (parking space). Then, vehicle 1 notifies vehicle 2 that vehicle 1 is approaching (coming close to) the parking space, via communication with vehicle 2 (communication via server 30 of vehicle dispatch center 3 in the example shown in FIG. 4 described later), for example.

When vehicle 2 receives the notification, vehicle 2 leaves the parking space and resumes automatically traveling around toward another location. For example, vehicle 2 returns to the vehicle dispatch station where vehicle 2 was located before going to destination D. Thus, vehicle 1 can be parked at the parking space where vehicle 2 has been parked (see FIG. 3D).

<Control Flow of Space-Reservation Control>

Figure 4:
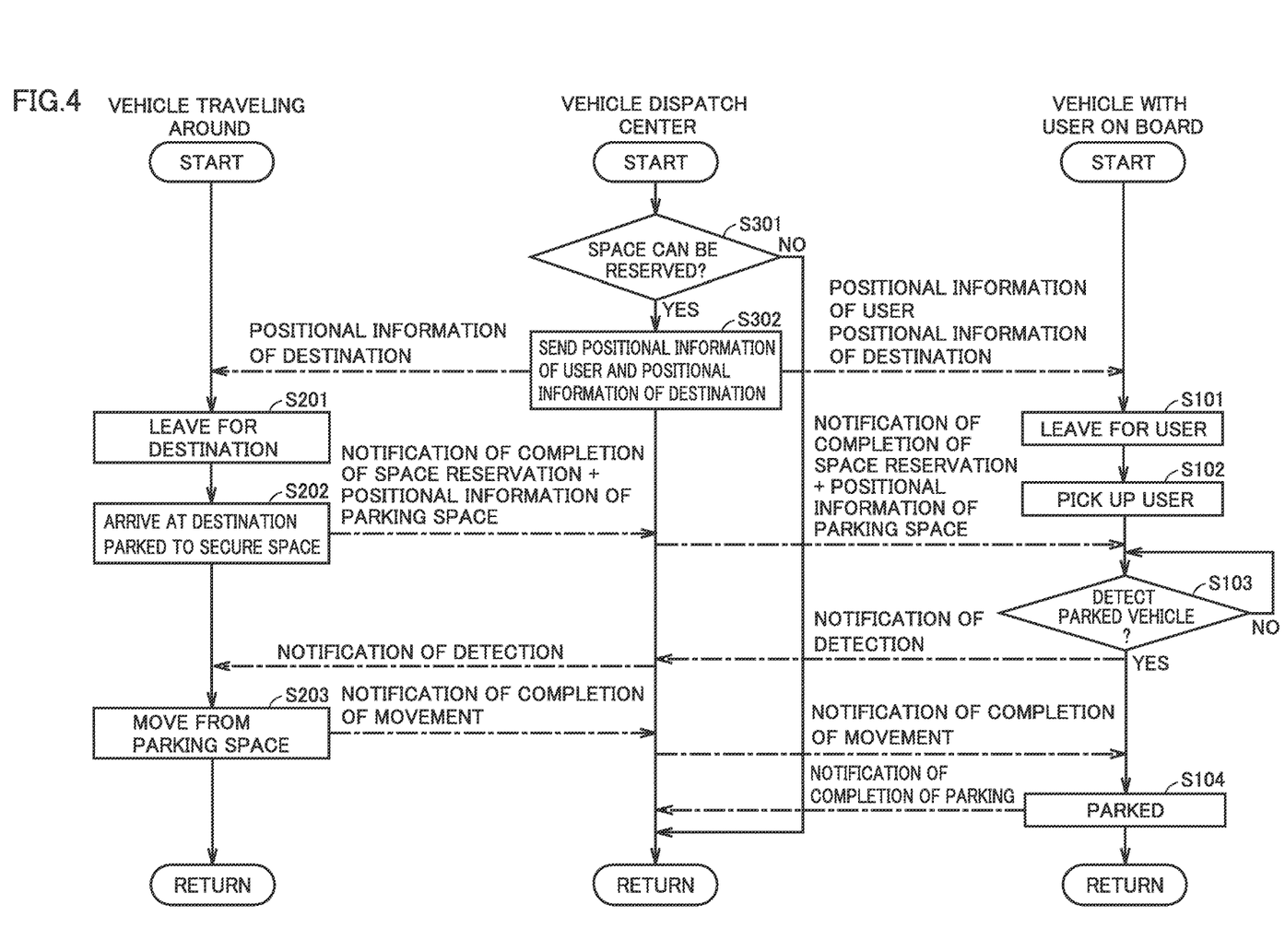
FIG. 4 is a flowchart for explaining space-reservation control in the present embodiment.
Figure 5:
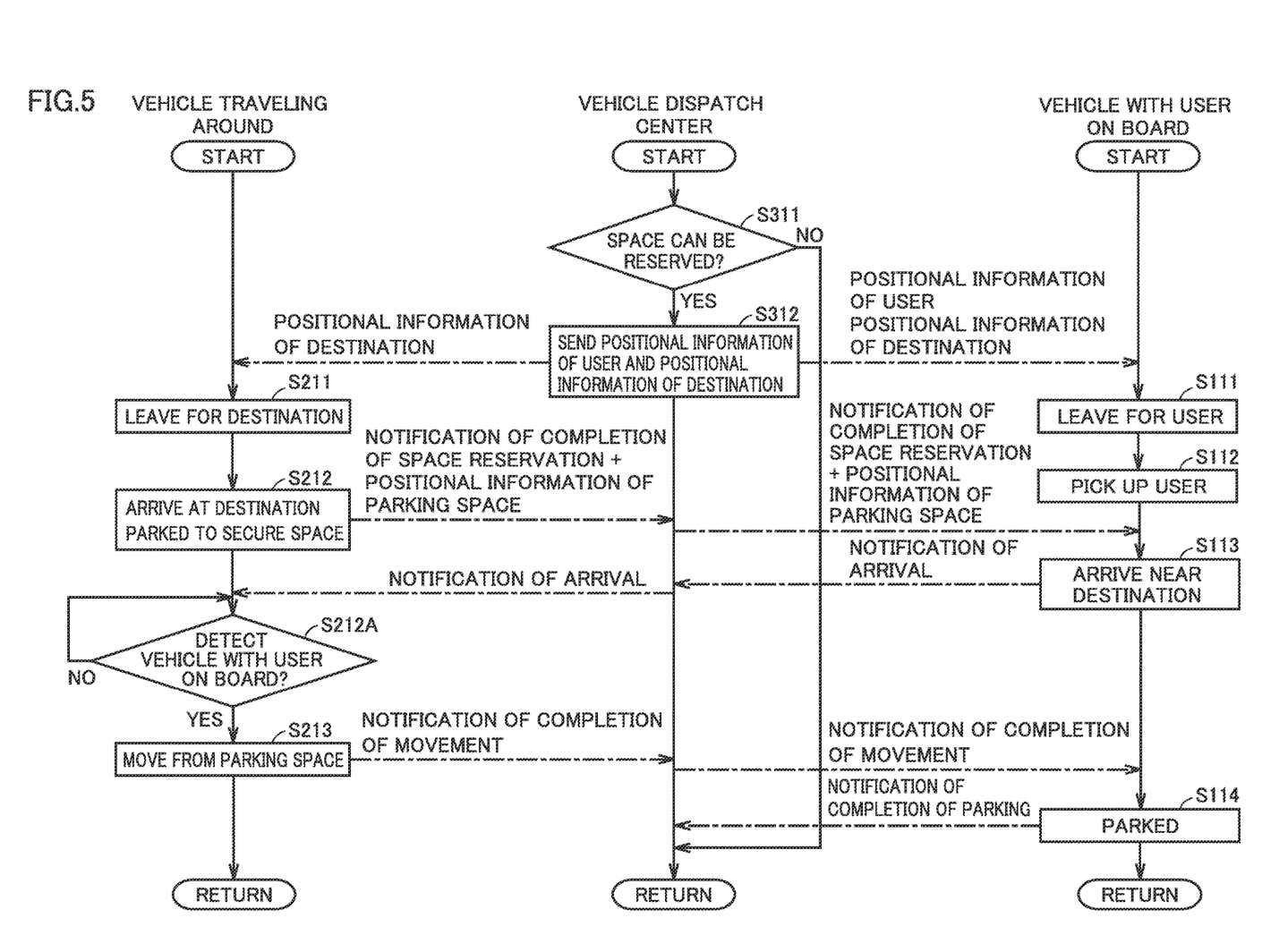
FIG. 5 is a flowchart for explaining space-reservation control in a variation 1 of the embodiment.
Figure 6:
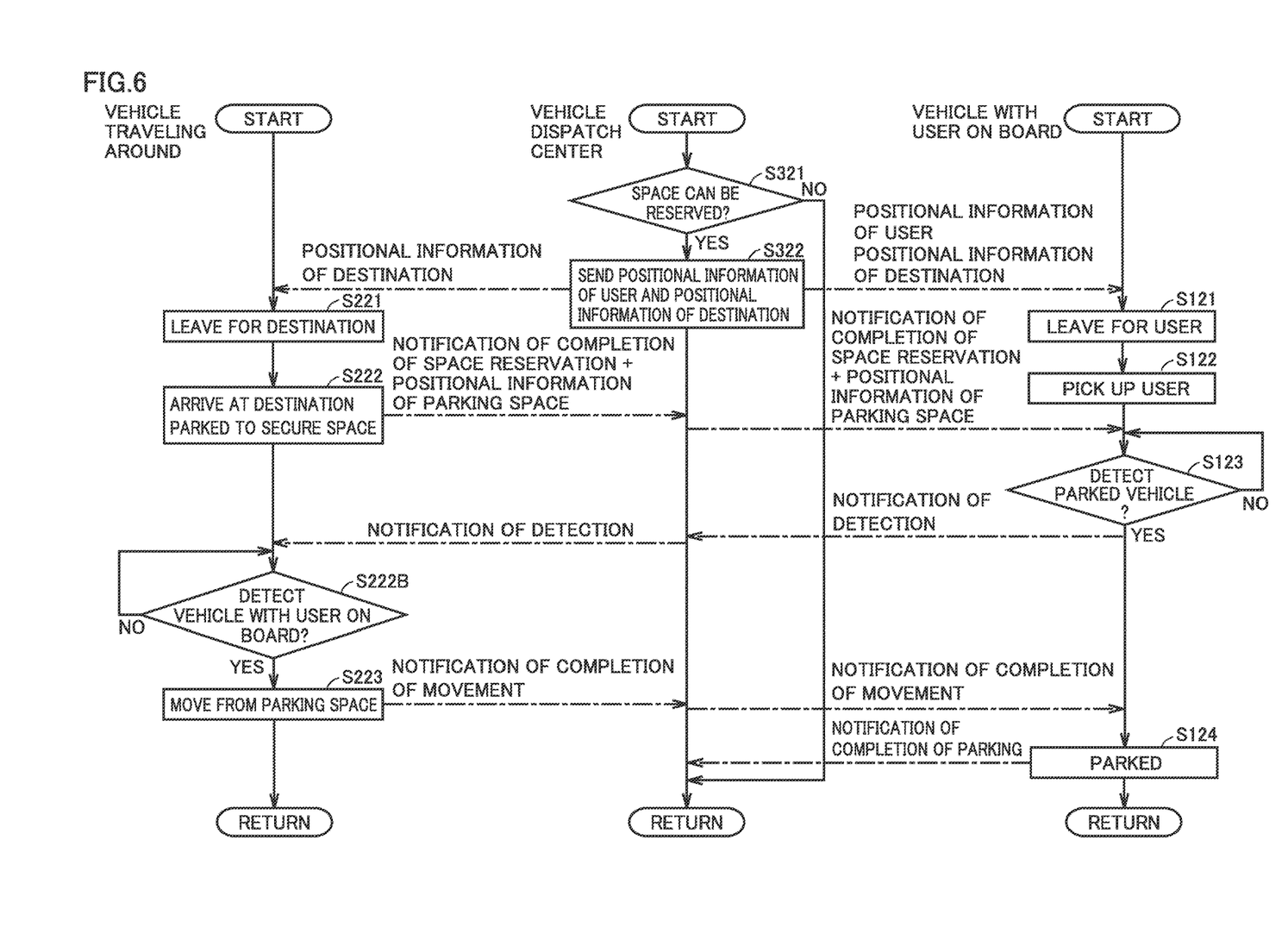
FIG. 6 is a flowchart for explaining space-reservation control in a variation 2 of the embodiment.

FIG. 4 is a flowchart for explaining the space-reservation control in the present embodiment. The steps (hereinafter referred to as "S" for short) included in the flowcharts shown in FIG. 4 and later-described FIGS. 5 and 6 are basically implemented by software processing by server 30 of vehicle dispatch center 3 or ECU 10 of each of vehicles 1, 2. However, the steps may be implemented by dedicated hardware (electric circuit) fabricated in server 30 or ECU 10.

In each of FIG. 4 to FIG. 6, a series of processes executed by ECU 10 of vehicle 2 that performs space reservation is shown at the left, a series of processes executed by server 30 of vehicle dispatch center 3 is shown at the center, and a series of processes executed by ECU 10 of vehicle 1 with a user on board is shown at the right.

The processes to be executed by server 30 are called from a main routine (not shown) for execution when server 30 receives a request for space reservation from the user's terminal 4. Along with the request for space reservation, positional information of the user (positional information of terminal 4) and positional information of destination D of the user are sent to server 30. Thus, server 30 can determine a vehicle (vehicle 2) that can arrive at destination D ahead of vehicle 1 from among a plurality of vehicles 10, based on these pieces of positional information. The processes to be executed by ECU 10 of each of vehicles 1, 2 are called from a main routine at regular time intervals for execution, for example.

With reference to FIG. 2 and FIG. 4, at S301, server 30 determines whether or not a parking space in destination D of the user is occupied, i.e., whether or not a space can be reserved. For example, server 30 identifies another vehicle near destination D using the positional information of destination D. Then, server 30 obtains a detection result (e.g. an image captured by a camera) from a sensor mounted on the other vehicle, and determines whether or not a parking space in destination D is occupied, based on the detection result.

If a parking space in destination D has already been occupied by another vehicle (NO at S301), server 30 determines that the parking space cannot be reserved, and returns the process to the main routine. At this time, server 30 may notify the user's terminal 4 that a parking space in destination D has already been occupied. Note that, however, the process at S301 is not essential.

If a parking space in destination D of the user is not occupied and a space can be reserved (YES at S301), then server 30 advances the process to S302 at which server 30 sends the positional information of the user and the positional information of destination D to vehicle 1, and sends the positional information of destination D to vehicle 2.

When vehicle 1 receives the positional information of the user and the positional information of destination D, vehicle 1 leaves for the user's location (S101). When vehicle 1 arrives at the current location of the user, vehicle 1 picks up the user and travels toward destination D (S102).

On the other hand, vehicle 2 leaves for destination D when receiving the positional information of destination D (S201, see FIG. 3A). At S202, vehicle 2 arrives at destination D and is parked at a parking space in destination D to secure the parking space for vehicle 1 with the user on board (see FIG. 3B). ECU 10 of vehicle 2 may send, to server 30 of vehicle dispatch center 3, a notification of the completion of space reservation and detailed positional information of the parking space of vehicle 2. The notification and the positional information are further sent to ECU 10 of vehicle 1. ECU 10 of vehicle 2 allows the notification to be displayed on a display (not shown) of vehicle 1, thereby allowing the user to know that the space reservation has completed. This notification may be sent to the user's terminal 4.

After that, vehicle 1 travels toward vehicle 2 based on the positional information of the parking space of vehicle 2. When vehicle 1 detects parked vehicle 2 with detector 14 (YES at S103), vehicle 1 notifies vehicle 2 that vehicle 1 has arrived at the parking space in destination D (see FIG. 3C). The detection of vehicle 2 with detector 14 may be implemented by a camera detecting the vehicle parked at the parking space received from vehicle 2. However, vehicle 1 may determine that vehicle 1 has come close to vehicle 2 simply when the distance between vehicle 1 and vehicle 2 (the position of the parking space) becomes shorter than a predetermined distance. The notification from vehicle 1 may be sent to vehicle 2 via vehicle dispatch center 3, or may be directly sent to vehicle 2 through vehicle-to-vehicle communication.

When vehicle 2 receives the notification, vehicle 2 moves from the parking space (S203). When vehicle 2 moves from the parking space, vehicle 2 notifies vehicle 1 of the completion of movement via vehicle dispatch center 3. Instead of this notification, vehicle 1 may detect the completion of movement of vehicle 2 using detector 14.

Figure 3D:
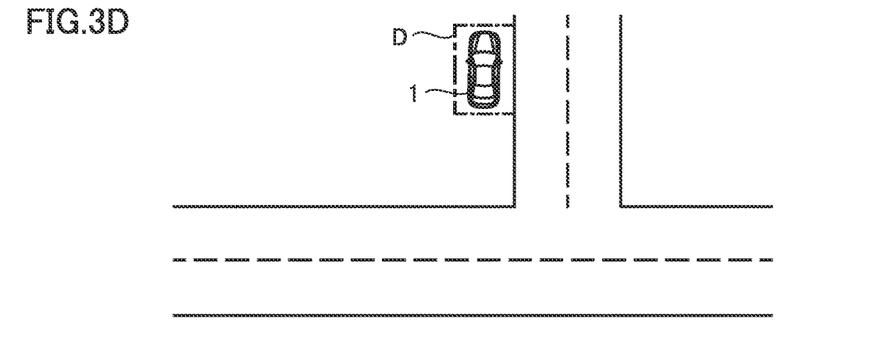
FIG. 3D is a diagram (the fourth diagram) schematically showing example space-reservation control in the present embodiment.

When vehicle 1 receives the notification of the completion of movement, vehicle 1 is parked at the parking space in destination D at S104 (see FIG. 3D). Vehicle 1 notifies vehicle dispatch center 3 of the completion of parking.

As described above, according to the present embodiment, vehicle 2 automatically traveling around with no driver on board is instructed to go to destination D ahead of vehicle 1 with the user on board, so that vehicle 2 can reserve a space for vehicle 1. This enables the user to reliably secure a parking space for vehicle 1. Thus, user convenience is enhanced.

In the present embodiment, at a timing when vehicle 1 approaches (comes close to) vehicle 2 and detects vehicle 2, an arrival notification is sent from vehicle 1 to vehicle 2 (see S103), and vehicle 2 moves from the parking space in response to the arrival notification (see S203). If the timing of movement of vehicle 2 is too early, such as before vehicle 1 arrives, a vehicle other than vehicle 1 may be parked at the parking space. On the other hand, if the timing of movement of vehicle 2 is too late, such as after vehicle 1 stops near the parking space of vehicle 2, vehicle 1 takes a long time before being parked. According to the present embodiment, vehicle 2 starts moving at the timing when vehicle 1 approaches vehicle 2 close enough for detector 14 to perform detection (for example, close enough for the camera to capture an image). Therefore, vehicle 1 can be smoothly parked at the parking space while preventing another vehicle from being parked at the parking space.

The timing of movement of vehicle 2 may be adjusted in accordance with the congestion level around the parking space. For example, the congestion level around the parking space on a certain day (and at a certain time zone) may be estimated by analyzing collected data (so-called big data) of the congestion level around the parking space in the past. For example, if the area around the parking space is estimated to be congested, the timing of movement of vehicle 2 is relatively delayed. That is, preventing another vehicle's parking is given higher priority. Thus, vehicle 1 can be reliably parked at the parking space. If the area around the parking space is estimated not to be so congested, on the other hand, the timing of movement of vehicle 2 may be relatively advanced. Thus, vehicle 2 can be used for another purpose.

[Variation 1]

The embodiment has described a configuration in which vehicle 1 with a user on board detects vehicle 2. However, vehicle 2 may be configured to detect vehicle 1.

FIG. 5 is a flowchart for explaining space-reservation control in variation 1 of the embodiment. With reference to FIG. 5, the flowchart is different from the flowchart shown in FIG. 4 in that the former includes a process of S113 instead of S103 and includes a process of S212A. The processes before S112 and S212 are the same as the corresponding processes of the embodiment.

When vehicle 1 receives a notification of the completion of space reservation and detailed positional information of the parking space of vehicle 2, and subsequently arrives near vehicle 2 (for example, within a predetermined distance from the position of the parking space), then vehicle 1 sends an arrival notification to parked vehicle 2. When vehicle 2 detects a vehicle approaching vehicle 2 after vehicle 2 receives the arrival notification (YES at S212A), vehicle 2 determines the vehicle to be vehicle 1 with the user on board, and moves from the parking space (S232). The processes after that are the same as the corresponding processes of the embodiment.

Variation 1 enables the user to reliably secure a parking space for vehicle 1 by using vehicle 2, as in the embodiment. As described in the present variation, a vehicle that detects the approach of vehicle 1 and vehicle 2 to each other may be vehicle 2 automatically traveling around.

[Variation 2]

The embodiment and variation 1 have described a configuration in which one of vehicles 1, 2 detects the other (one-way detection configuration). However, a configuration in which both vehicles 1, 2 detect each other (two-way detection configuration) may be possible, as described below.

FIG. 6 is a flowchart for explaining space-reservation control in variation 2 of the embodiment. This flowchart is different from the flowchart in the embodiment (see FIG. 4) in that the former includes a process of S222B. The processes before S122 and S222 are the same as the corresponding processes of the embodiment.

When vehicle 1 travels toward vehicle 2 based on positional information of the parking space of vehicle 2 and detects parked vehicle 2 with detector 14 (YES at S123), then vehicle 1 notifies vehicle 2 that vehicle 1 has arrived at the parking space (vehicle 1 has detected vehicle 2). When vehicle 2 receives this notification and subsequently detects vehicle 1 with detector 14 (YES at S222B), then vehicle 2 moves from the parking space (S223). The processes after that are the same as the corresponding processes of the embodiment.

As described above, variation 2 enables the user to reliably secure a parking space for vehicle 1 by using vehicle 2, as in the embodiment and variation 1. Further, since movement of vehicle 2 starts when both vehicle 1 and vehicle 2 detect each other's approach, vehicle 2 can be moved from the parking space more reliably and at an appropriate timing.

[Variation 3]

If the parking space in destination D is a pay parking space, a double payment may be required: a parking fee for vehicle 2 used to reserve a space for vehicle 1; and a parking fee for vehicle 1. This discourages a user from using the service implemented with the space-reservation control. In variation 3, a configuration for reducing a parking fee is described.

Figure 7:
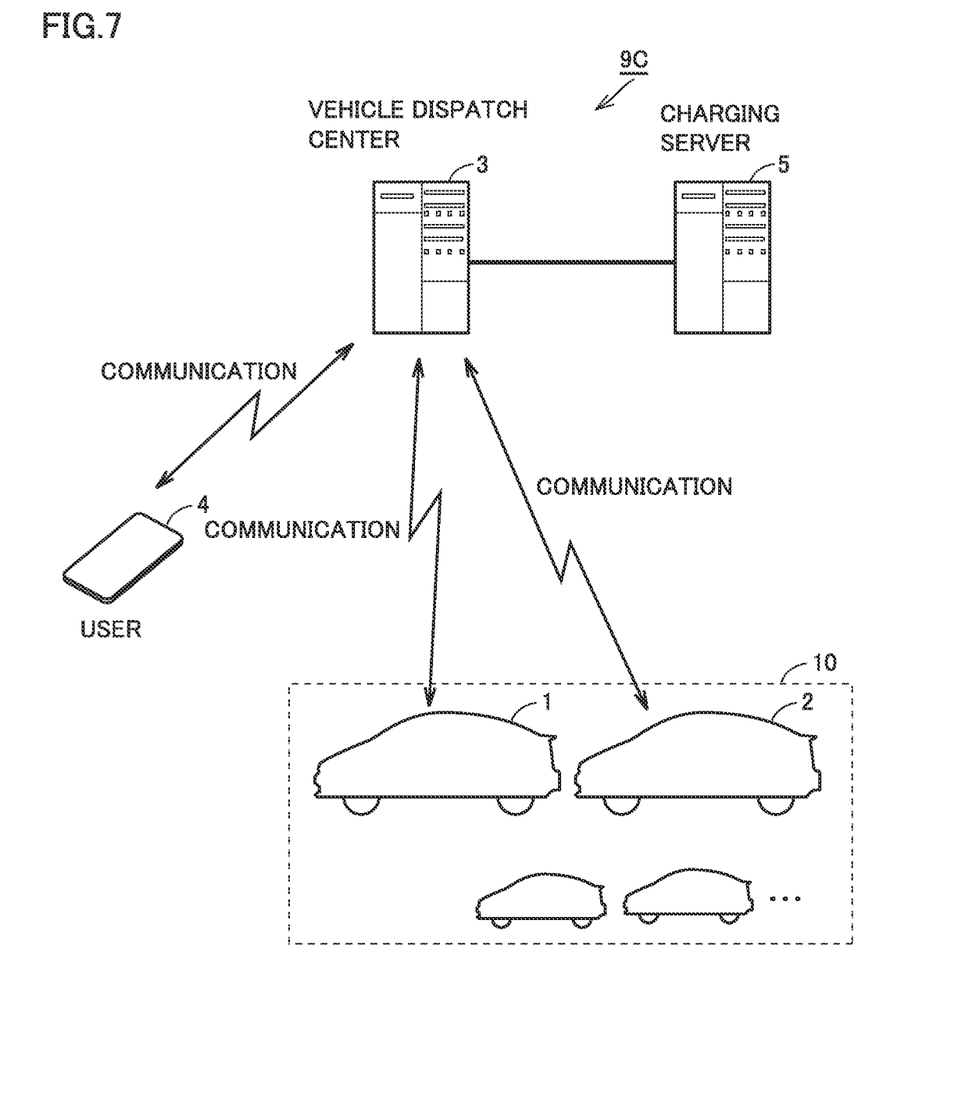
FIG. 7 is a diagram schematically showing a general configuration of a parking fee charging system according to a variation 3 of the embodiment.

FIG. 7 is a diagram schematically showing a general configuration of a parking fee charging system according to variation 3 of the embodiment. With reference to FIG. 7, a parking fee charging system 9C includes a charging server 5, in addition to a plurality of vehicles 10 including vehicles 1, 2, and vehicle dispatch center 3. Charging server 5 is configured to communicate with server 30 of vehicle dispatch center 3 and determine a parking fee for a parking space provided in destination D. The user is asked to pay the parking fee determined by charging server 5 at a later date.

In the present variation, charging server 5 receives from server 30 a notification that the space-reservation control using vehicles 1, 2 has been executed at a parking space in destination D. Specifically, charging server 5 receives from server 30 a notification that vehicle 2 was parked at a parking space in destination D and that vehicle 1 was parked at the same parking space after vehicle 2 moved away. Then, charging server 5 sets the parking fee with the space-reservation control lower than the parking fee with no consideration of the space-reservation control, i.e., lower than the sum of the normal parking fee of vehicle 1 and the normal parking fee of vehicle 2.

As an example, suppose a charging system for a parking lot in destination D is a system in which a predetermined fee X is charged per hour (fractions less than one hour are rounded up). Suppose a case in which vehicle 2 was parked in destination D for 30 minutes to reserve a space, and in which vehicle 1 was parked for one and a half hours in destination D.

If the parking fees of vehicles 1, 2 are separately calculated, the parking fee for vehicle 2 is X and the parking fee for vehicle 1 is 2X, the sum being 3X. However, charging server 5 charges for the total parking hours of vehicles 1, 2, for example. In the above example, the total parking hours of vehicles 1, 2 are two hours, and therefore the parking fee is calculated to be 2X.

As another example, charging server 5 may set the parking fee for vehicle 2 used to reserve a space lower than the parking fee for a normal vehicle (vehicle 1 with the user on board). For the vehicle used to reserve a space, the fee per hour is set lower at a predetermined rate, e.g. 0.5X. In this case, charging server 5 calculates the parking fee for vehicle 2 to be 0.5X and calculates the parking fee for vehicle 1 to be 2X, the sum of the parking fees being 2.5X.

As still another example, charging server 5 may determine an amount obtained by subtracting a certain amount (e.g. 0.5X) from the parking fee for a normal vehicle (vehicle 1 with the user on board), to be the parking fee for vehicle 2 used to reserve a space. Charging server 5 calculates the parking fee for vehicle 2 to be X, calculates the parking fee for vehicle 1 to be 2X, and subtracts 0.5X. Therefore, the sum of the parking fees is 2.5X.

As described above, according to variation 3, when charging server 5 receives from server 30 a notification that the space-reservation control has been executed, charging server 5 sets a parking fee lower than when charging server 5 does not receive the notification. This encourages a user to use the service implemented with the space-reservation control with a vehicle that automatically travels around. Thus, user convenience is enhanced.

Although embodiments of the present disclosure have been described, it should be understood that the embodiments disclosed herein are by way of illustration and example only in every respect, and are not to be taken by way of limitation. The scope of the present disclosure is defined by the terms of the appended claims and is intended to include any modification within the scope and meaning equivalent to the terms of the claims.

What is claimed is:

1. A vehicle dispatch method for dispatching a first vehicle and a second vehicle by a vehicle dispatch server based upon a request of a user of the first vehicle, each of the first vehicle and the second vehicle being configured to perform automated driving, the method comprising:
   receiving positional information of a current location of a user and positional information of a destination of the user from a terminal of the user, and dispatching the first vehicle to the current location using the positional information of the current location, by the vehicle dispatch server;
   dispatching, by the vehicle dispatch server, the second vehicle with no driver on board to the destination using the positional information of the destination;
   when the second vehicle arrives at the destination, the second vehicle parking at a parking space in the destination;
   when it is detected that the first vehicle with the user on board approaches the parking space, the second vehicle moving from the parking space; and
   the first vehicle with the user on board parking in the parking space where the second vehicle has been parked.

2. The vehicle dispatch method according to claim 1, wherein
   the first vehicle includes a detector configured to detect a situation outside the first vehicle, and
   the moving includes:
      when the first vehicle detects the second vehicle with the detector, notifying the second vehicle, by the first vehicle, that the first vehicle has detected the second vehicle; and
      in response to the notifying by the first vehicle, the second vehicle moving from the parking space.

3. The vehicle dispatch method according to claim 1, wherein
   the second vehicle includes a detector configured to detect a situation outside the second vehicle, and
   the moving includes the second vehicle moving from the parking space when the second vehicle detects the first vehicle with the detector.

4. The vehicle dispatch method according to claim 1, wherein
   the first vehicle includes a first detector configured to detect a situation outside the first vehicle,
   the second vehicle includes a second detector configured to detect a situation outside the second vehicle, and
   the moving includes:
      notifying the second vehicle, by the first vehicle, that the first vehicle has detected the second vehicle with the first detector;
      detecting the first vehicle by the second vehicle with the second detector; and
      after the notifying and the detecting, the second vehicle moving from the parking space.

5. A vehicle dispatch system comprising:
   a communicator configured to communicate with a first vehicle and a second vehicle each configured to perform automated driving; and
   a vehicle dispatch server configured to manage dispatch of the first vehicle and the second vehicle based upon positional information of a destination of a user of the first vehicle,
   when the vehicle dispatch server receives positional information of a current location of a user and positional information of a destination of the user from a terminal of the user, the vehicle dispatch server being configured to dispatch the first vehicle to the current location using the positional information of the current location, and dispatch the second vehicle with no driver on board to the destination using the positional information of the destination,
   when the second vehicle arrives at the destination, the second vehicle being parked at a parking space in the destination,
   when it is detected that the first vehicle with the user on board approaches the parking space, the second vehicle moving from the parking space, and
   the first vehicle with the user on board being parked in the parking space where the second vehicle has been parked.

6. A parking fee charging system comprising:
   the vehicle dispatch system according to claim 5; and
   a charging server configured to communicate with the vehicle dispatch server in the vehicle dispatch system and determine a parking fee,
   the parking space being a pay parking space,
   the charging server being configured to, when the charging server receives from the vehicle dispatch server a notification that the second vehicle was parked at the parking space and that the first vehicle was subsequently parked at the same parking space, determine a sum of a parking fee for the first vehicle and a parking fee for the second vehicle to be lower than when the charging server does not receive the notification.

* * * * *